United States Patent [19]

Maeda

[11] Patent Number: 5,428,739
[45] Date of Patent: Jun. 27, 1995

[54] DISPLAY CONTROL SYSTEM FOR SETTING GRAY SCALE LEVELS USING POPUP MENU

[75] Inventor: Mayumi Maeda, Tokyo, Japan

[73] Assignee: Kabushiki Kaisha Toshiba, Kawasaki, Japan

[21] Appl. No.: 261,307

[22] Filed: Jun. 16, 1994

Related U.S. Application Data

[63] Continuation of Ser. No. 781,929, Oct. 24, 1991, abandoned.

[30] Foreign Application Priority Data

Nov. 27, 1990 [JP] Japan .................... 2-320974

[51] Int. Cl.[6] .......................... G06F 3/14; G09G 5/10
[52] U.S. Cl. ................... 395/161; 395/156; 395/132; 395/131; 345/3; 345/147; 345/154
[58] Field of Search .............. 395/132, 131, 161, 157, 395/156, 155; 345/147, 153, 154, 155, 3, 199

[56] References Cited

U.S. PATENT DOCUMENTS

| | | | |
|---|---|---|---|
| 4,563,740 | 1/1986 | Blake et al. | 340/793 X |
| 4,827,255 | 5/1989 | Ishii | 340/793 |
| 4,980,678 | 12/1990 | Zenda | 345/3 |
| 5,028,917 | 7/1991 | Imanishi et al. | 340/793 |
| 5,153,577 | 10/1992 | Mackey et al. | 340/793 |
| 5,155,478 | 10/1992 | Sekiya et al. | 395/132 X |
| 5,222,206 | 6/1993 | Liao | 395/131 |
| 5,298,893 | 3/1994 | Sekine | 345/3 X |
| 5,351,064 | 9/1994 | Zenda | 345/3 |

FOREIGN PATENT DOCUMENTS 0295689 12/1988 European Pat. Off. .
3910340 10/1989 Germany .

OTHER PUBLICATIONS

Micrografx Windows Draw User's Guide, Micrografx, Inc., 1986, pp. 101-103.

Primary Examiner—Raymond J. Bayerl
Attorney, Agent, or Firm—Finnegan, Henderson, Farabow, Garrett & Dunner

[57] ABSTRACT

When an application program is being executed, a popup menu screen is displayed on a display device in response to a depression of specific keys on a keyboard. The popup menu screen displays a plurality of types of data indicating gray scale levels. A user selects one of the data indicating gray scale levels. Gray scale data are set in pallet registers in a display controller on the basis of the selected data indicating the gray scale level. As a result, a screen display based on the selected gray scale levels can be obtained in real time.

5 Claims, 3 Drawing Sheets

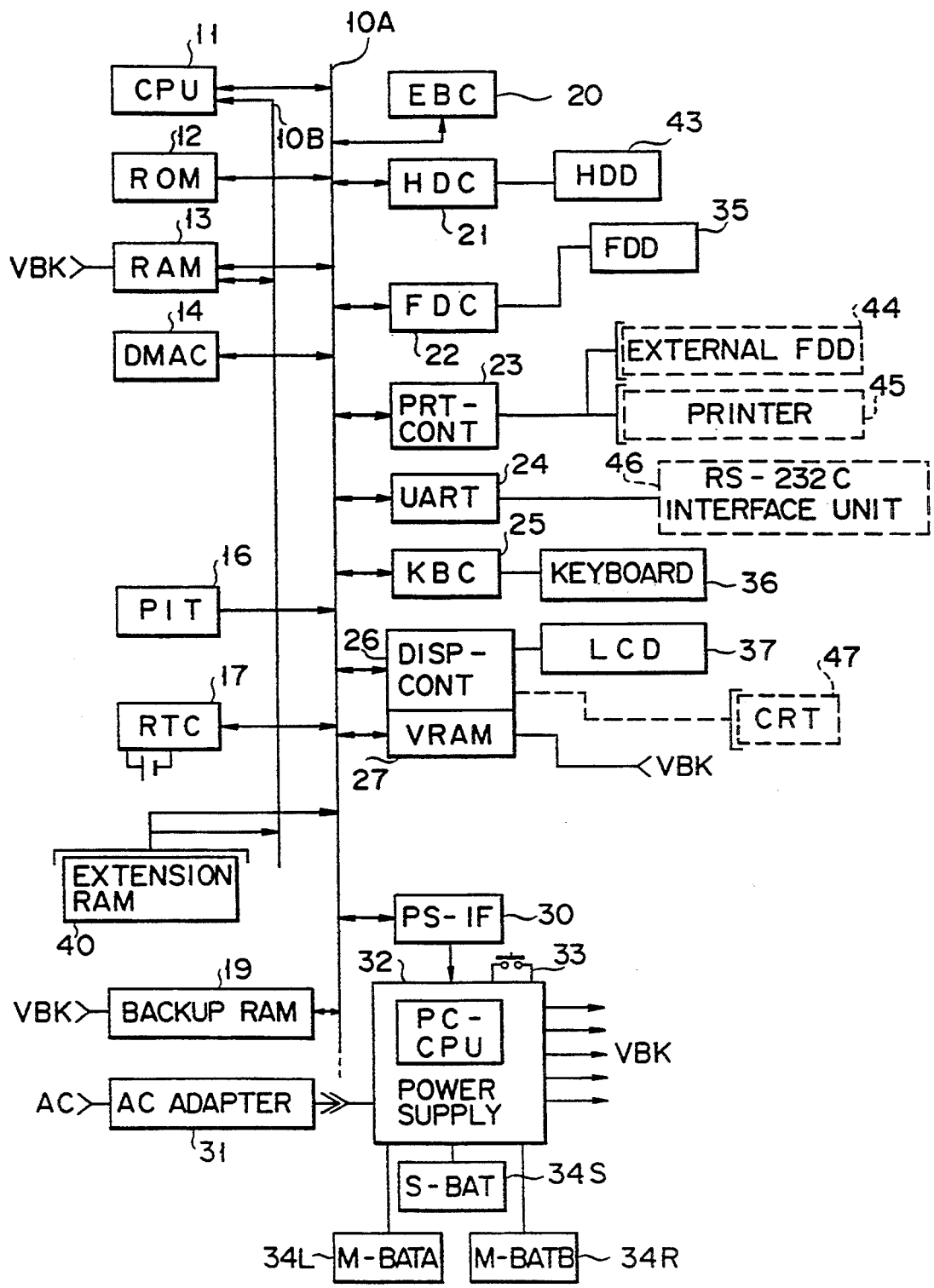
F I G. 1

```
REMAINING BATTERY CAPACITY

< LEFT > : E ▶▶▶▶▶▶▶ F < RIGHT > : E ▶▶▶▶▶▶▶ F

SPEAKER ▶ [ON]        MODE : [RESUME] BOOT

AUDIBLE BATTERY WARNING : [ON] OFF

GRAY SCALE : ■(1) NORMAL 8 GRAY SCALES
          61

(2) NORMAL 16 GRAY SCALES (3) REVERSE 8 GRAY SCALES (4) REVERSE 16 GRAY SCALES (5) CURRENT SET VALUE
```

F I G. 3

DISPLAY CONTROL SYSTEM FOR SETTING GRAY SCALE LEVELS USING POPUP MENU

This application is a continuation of application Ser. No. 07/781,929, filed Oct. 24, 1991, now abandoned.

BACKGROUND OF THE INVENTION

1. Field of the Invention

The present invention relates to a display control system for setting a gray scale level, which system is especially suitable for use in a portable computer.

2. Description of the Related Art

In the field of portable computers, so-called lap-top type computers which are compact, lightweight, and convenient for carrying, have become popular in place of conventional desk-top type computers. As a display device for this portable computer, a flat panel display such as a liquid crystal display (LCD) or a plasma display is used. Therefore, a multi-gradation display is made upon designation of most of application programs which are capable of multi-color display.

Conventionally, gray scale levels are set and changed using a special-purpose tool. After a system is started, a program for installing the special-purpose tool is executed on the operating system, so that the tool (gray scale level setting/changing program; to be simply referred to as VCHAD hereinafter) is resident in a main memory. Thereafter, a user executes specific key operations as needed to start the VCHAD program. The VCHAD program presents all the currently used display set values one by one, thus urging the user to perform a setting operation. Values set by the user are reflected on an actual screen display in a real-time manner.

In addition to the VCHAD, an environmental setting program (setup program) inherent to a system may be adopted. With the setup program, individual set values cannot be set. The setup program has some combinations of set values, which are generally determined to be proper, as inherent values, and a user selects one of these inherent values. The selection made by the user is stored in a back-up memory, and thereafter, the system is rebooted to set various display set values. Therefore, an actual screen display according to the user's selection is obtained after setup processing and reboot processing.

In the above-mentioned prior arts, in the former method, the VCHAD program must be resident in the memory. For example, when a display method is changed during execution of another application software program, if the VCHAD program is not resident in the memory, a user must give up this change, or temporarily ends the currently executed application software program, and must execute the VCHAD installation program. Thereafter, the user must change the display method. The VCHAD program requests setting of all the display set values which are currently used. More specifically, in a gray scale display capable of displaying 16 levels, a maximum of 16 set values are necessary. It is very difficult and cumbersome for a user who is not accustomed with a computer to designate a proper display method while balancing all these set values.

In the latter method, i.e., when the setup program is used, the content selected by a user does not appear in real time on an actual display screen. Therefore, the user cannot immediately determine optimal selection. Since the system must be rebooted, if the user performs some unique setting operations, all these set values are undesirably lost. For example, when the user sets a baud rate or the number of bits of start or stop bits in an application program for performing a communication, if gray scale levels are changed in the setup processing, various parameters set by the user are reset to default values after the reboot operation.

SUMMARY OF THE INVENTION

It is an object of the present invention to provide a display control system which allows a user to select one of several gray scale display functions, which are generally considered to be proper, and can reflect the user's selection on a screen in real time.

In order to achieve the above object, a display control system of the present invention comprises: a display controller, in which gray scale levels are set in correspondence with colors designated by an application program, and which performs display control; a display device for displaying display data; input means for inputting a change instruction of gray scale data during an operation of the system; means, responsive to the change instruction from the input means, for opening a window on the display device, and displaying a plurality of types of data indicating gray scale levels; means for selecting one of the displayed data indicating the gray scale levels; and means for setting the selected data indicating the gray scale levels in the display controller, and performing a screen display.

According to the present invention, several combinations of a large number of display set values, which are generally considered to be proper, are prepared as inherent values, and a user selects one of these inherent values by proper key inputs. A content selected by the user is reflected on an actual screen in real time. A program for realizing this function is inherent to a system, and can be started by a specific key input without requiring special installation processing after the system is started. Since the program is inherent to the system, and need not be resident in a memory in advance, a user can always perform a setting operation. Since proper combinations of values are prepared, even a user who is not accustomed with a computer can readily realize a proper screen display. Since a display is changed in real time, a user can perform a setting operation while confirming optimal selection.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a system block diagram showing an embodiment of a portable computer to which the present invention is applied;

FIG. 3 shows an example of a popup menu screen.

DETAILED DESCRIPTION OF THE PREFERRED EMBODIMENTS

Figure 2:
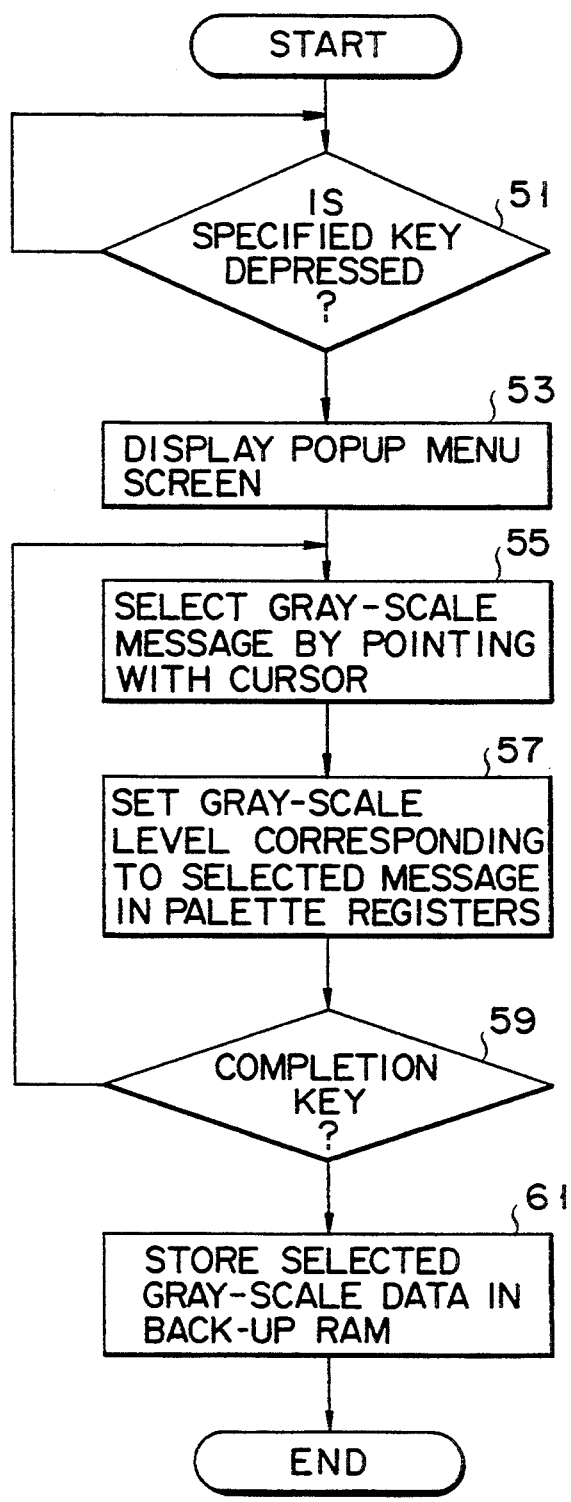
FIG. 2 is a flow chart showing an operation of the embodiment of the present invention.

FIG. 1 is a block diagram showing an arrangement of a portable computer according to an embodiment of the present invention.

In FIG. 1, reference numeral 10A denotes a system bus; and 10B, an internal bus. Reference numerals 11 through 30 are components to be connected to the system bus 10A. Of these components, reference numeral 11 denotes a CPU (main CPU) for controlling the overall system. The CPU 11 accesses a BIOS-ROM 12 upon power-on, and executes a popup program shown in FIG. 3.

Reference numeral 12 denotes the BIOS-ROM for storing, e.g., a permanent program. The permanent program includes a processing routine for executing the popup processing shown in FIG. 2.

Reference numeral 13 denotes a RAM constituting a main memory for storing a program, data, and the like to be processed; and 14, a DMA controller (DMAC; Direct Memory Access Controller) for performing direct memory access control.

Reference numeral 16 denotes a programmable interval timer (PIT), which includes a programmable interrupt controller (PIC). Reference numeral 17 denotes a real-time clock (RTC) which has a self-operating battery, and stores data such as date data, time data, system control data, and the like which must always be preserved.

Reference numeral 19 denotes a back-up RAM serving as a data storage area for realizing a resume function. The back-up RAM 19 is supplied with a back-up power supply (VBK). The back-up RAM 19 stores gray scale levels set in a palette register in a display controller 26 (to be described later), and parameters necessary for other display control operations.

Reference numeral 20 denotes an extension bus connector (EBC), to which various extension optional devices such as an extension memory board, a communication board, and the like, mounted on an extension unit 41 are connected.

Reference numeral 21 denotes a hard disk controller (HDC) for interface-connecting a hard disk pack 43. Reference numeral 22 denotes a floppy disk controller (FDC), which can control one floppy disk drive (FDD) 35.

Reference numeral 23 denotes a printer controller (PRT-CONT) to which, e.g., a 5' external floppy disk drive 44, a printer 45, or the like is selectively connected via a connector. Reference numeral 24 denotes an input-/output interface (UART; Universal Asynchronous Receiver/Transmitter), to which an RS-232 C interface device 46, or the like is connected, as needed. Reference numeral 25 denotes a keyboard controller (KBC) for controlling inputs from a keyboard 36 integrally arranged on the apparatus main body which packages a CPU board. The keyboard 36 comprises specific keys (e.g., a function key and an escape key) for displaying a popup menu (to be described layer) on a display device (LCD) 37. Reference numeral 26 denotes a display controller (DISP-CONT).

In this embodiment, the display controller 26 drives only the LCD 37 with a backlight (or side light), which is packaged in a display unit housing pivotally arranged on the apparatus main body. In addition, the display controller 26 can also control a display drive operation of a CRT display unit 47 as an external display. The display controller 26 has, e.g., 16 palette registers, as will be described later, and gray scale levels corresponding to a gray scale message selected by the user are set in the corresponding registers. More specifically, in this embodiment, 16 gray scale levels out of about 260,000 colors can be displayed on the LCD 37, and correspond to the 16 mapping registers, respectively. In each mapping register, the gray scale level corresponding to the selected color, i.e., one of 0th to 16th gray scale levels in this embodiment, is set. Reference numeral 27 denotes a video RAM (VRAM) supplied with the back-up power supply (VBK); and 30, a power supply control interface (PS-IF) for connecting a power supply circuit (intelligent power supply) 32 to the CPU 11 via the system bus 10A. The power supply control interface 30 has a serial-parallel conversion function for performing a data transfer operation with a power control CPU (PC-CPU) of the power supply circuit 32 using a serial interface. Reference numeral 31 denotes a power supply adapter (to be referred to as an AC adapter hereinafter) for rectifying and smoothing a commercial AC power supply to obtain a DC operation power supply of a predetermined potential. The AC adapter is plug-in-connected to the portable computer main body. Reference numeral 32 denotes the power supply circuit (intelligent power supply) comprising the power control CPU (PC-CPU); 33, a power switch for turning on/off the power supply of the portable computer main body; and 34L and 34R, main battery packs (M-BATA and M-BATB) which comprise rechargeable batteries, and are detachable from the apparatus main body (PC main body). In this embodiment, one of these batteries is selected as a battery to be used (battery for supplying a power supply voltage) under the control of the power supply circuit 30, and when the selected battery is discharged to its use limit, the battery to be used is switched, and the other battery is used. Reference numeral 34S denotes a sub battery (S-BAT) which also comprises a rechargeable battery, and is incorporated in the main body. The sub battery 34S supplies a back-up power supply voltage (VBK) to memories to be backed up, such as the RAM 13, an extension RAM 40, the VRAM 27, and the like.

Reference numeral 40 denotes the extension RAM which can be inserted/removed in/from the special-purpose card slot of the portable computer main body. Reference numeral 41 denotes the extension unit selectively connected to the extension bus connector (EBC) 20. Various extension optional devices such as an extension memory board, a communication board, and the like are mounted on the extension unit 41. Reference numeral 42 denotes an internal connector for interface-connecting the hard disk pack stored in the main body when the portable computer main body is upgraded to a hard-disk (HDD) mount type (which mounts one HDD and one FDD). The hard disk pack 43 is interface-connected via the connector 42.

The operations according to the embodiment of the present invention will be described hereinafter. A schematic operation will be described below. As the characteristic feature of the present invention, several combinations of a large number of display set values, which are generally considered to be proper, are prepared as inherent values, and a user selects one of these inherent values by proper key inputs. A content selected by the user is reflected on an actual screen in real time. This function is inherent to the system, and can be started by a specific key input without requiring special installation processing after the system is started. When a user selects one of several combinations prepared as the inherent values, values corresponding to the selected combination are stored in the back-up memory 19. According to the present invention, when individual set values are changed by a gray scale control program (e.g., VCHAD), and a combination different from those of set values prepared in this program is realized, this combination is added to selection items. This program will be referred to as a popup program (POPUP-P) hereinafter. With this popup program, a screen display method can be easily realized in real time.

The embodiment of the present invention will be described in detail below with reference to FIGS. 2 and 3. When a portable computer system is started, it sets values in various registers in the display controller 26. The display device 37 performs a display according to the designated display method. Thereafter, when a user wants to change the display method on the display device 37, he or she makes a specific key input on the keyboard 36. For example, the user simultaneously depresses a function key and an escape key on the keyboard 36. The CPU 11 detects depression of these keys in step 51 in FIG. 2. In response to this key depression detection, the CPU 11 loads the popup program stored in the BIOS-ROM 12 onto the main memory 13, and executes the popup program.

Upon execution of the popup program, the CPU 11 causes the display device 37 to display a popup menu screen in step 53. More specifically, a window is opened on a portion of the screen of the display 37, and a popup menu screen shown in, e.g., FIG. 3 is displayed within the window. The popup menu screen displays messages for selecting one of five gray scale data in addition to the remaining capacity of a battery, an ON/OFF state of a resume mode, and the like, as shown in FIG. 3. More specifically, the messages include "(1) normal 8 gray scales", "(2) normal 16 gray scales", "(3) reverse 8 gray scales", "(4) reverse 16 gray scales", and "(5) current set value". Note that (5) current set value is not always displayed, but is displayed only when a user changes gray scale levels using the VCHAD program. When the user changes the gray scale levels, and displays the popup menu, but does not want to use any of "normal 8 gray scales", "normal 16 gray scales", "reverse 8 gray scales", and "reverse 16 gray scales", he or she can select "(5) current set value" to end the gray scale level changing processing using the popup menu.

Note that whether or not the user changes the gray scale levels using the VCHAD program can be determined as follows. That is, when the user depresses the specific keys (the function key and the escape key), the contents of the 16 palette registers in the display controller 26 are compared with set values of the palette registers of "normal 8 gray scales", "normal 16 gray scales", "reverse 8 gray scales", and "reverse 16 gray scales", thus checking if the contents are changed. If the contents are changed, a message "(5) current set value" is displayed. More specifically, if the combination of the values currently set in the 16 palette registers coincides with one of the combinations (1) to (4) of gray scale levels, it is determined that the default values are selected, and the fifth message is not displayed.

The user selects one of the messages (1) to (5) displayed on the screen using a cursor 61. When the message "normal 8 gray scales" is selected, the CPU 11 sets gray scale data in the palette registers in the display controller 26 in accordance with a predetermined combination of gray scale levels corresponding to "normal 8 gray scales", and sets a parameter indicating a normal display in a corresponding register in the display controller 26 in step 57. When the message "normal 16 gray scales" is selected, the CPU 11 performs similar processing as in a case wherein the message "normal 8 gray scales" is selected. When the message "reverse 8 gray scales" or "reverse 16 gray scales" is selected, the CPU 11 sets gray scale levels in the corresponding palette registers in the same manner as in "normal 8 gray scales" and "normal 16 gray scales", and supplies data indicating a reverse display to the display controller 26.

The display controller 26 causes the display device 37 to perform a display in accordance with the gray scale level data set in the palette registers, and other display timing parameters (e.g., a horizontal sync signal, a vertical sync signal, an effective display period signal, and the like). An example of display control at this time is described in U.S. Pat. No. 4,980,678 assigned to the same assignee as the present invention.

As a result, the screen display of the display device is immediately changed to that according to the selected gray scale data. Therefore, the user can immediately determine whether or not the selected gray scale data are desirable. If the selected gray scale data are not desirable, another gray scale data message on the popup screen can be selected again in step 55.

When selection of the gray scale levels using the popup screen is ended, end keys (e.g., the function key and the escape key) on the keyboard 36 are depressed again. The CPU 11 detects depression of these keys in step 59. Upon detection of this key depression detection in step 61, the gray scale data selected by the user are stored in the back-up RAM 19, and the popup processing routine is ended. When the user selects "(5) current set value", the CPU 11 does not change the content of the back-up RAM 19.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A display control apparatus in a computer system, which has video memory for storing a screen image, a monochromatic flat panel display device for displaying the screen image thereon with N kinds of gray scales, the N being an integer value, and to which a color CRT display device is arbitrarily connected, the color CRT display device for displaying the screen image data thereon with M kinds of color scales, the M being an integer value greater than the N, the display control apparatus comprising:

a display controller having a plurality of mapping registers in which gray scale data are set for colors designated by a color application program, wherein said display controller controls at least one of the monochromatic flat panel display device and the color CRT display device;

means for inputting data and a change instruction command to change the gray scale data during execution of the application program;

means, responsive to the change instruction command from the inputting means, for opening a window on said monochromatic flat panel display device to display a plurality of menu items indicative of a group of gray scale levels between colors currently designated by the color application program and their corresponding gray scale data within the window, wherein the group of gray scale levels corresponds to each of the colors;

means for selecting one of the menu items by the inputting means;

means for setting the gray scale data in the mapping registers in response to the selection of one of the menu items so that the monochromatic flat panel display device controlled by the display controller displays a new screen image reflecting the gray scale data set by the setting means in real time.

2. The apparatus according to claim 1, wherein the gray scale data in accordance with the selected menu item include data indicating the number of gray scale levels, and data indicating one of a normal display and a reverse display.

3. The apparatus according to claim 1, wherein the menu items include a menu item indicating gray scale data set in the mapping registers.

4. The apparatus according to claim 1, wherein the setting means includes means for saving the gray scale data in accordance with the selected menu item in a battery-back-up memory.

5. A display control apparatus in a computer system, which has video memory for storing a screen image, a monochromatic flat panel display means for displaying the screen image thereon with N kinds of gray scales, the N being an integer value, and to which a color CRT display device is arbitrarily connected, the color CRT display device for displaying the screen image data thereon with M kinds of color scales, the M being an integer value greater than the N, the display control apparatus comprising:

display controller means, having a plurality of mapping registers in which gray scale data are set in correspondence with colors designated by a color application program, for controlling the monochromatic flat panel display means using the gray scale data;

means for receiving a change instruction command and data during execution of the program, the data identifying the selection of one of a plurality of menu items indicative of a group of gray scale levels between colors currently designated by the color application program and their corresponding gray scale data, wherein the group of gray scale levels corresponds to each of the colors;

means, responsive to the change instruction command, for signaling the monochromatic flat panel display means to display a menu window including the plurality of menu items; and means for resetting the gray scale data in the mapping registers corresponding to the received data.

* * * * *